FIG. 7

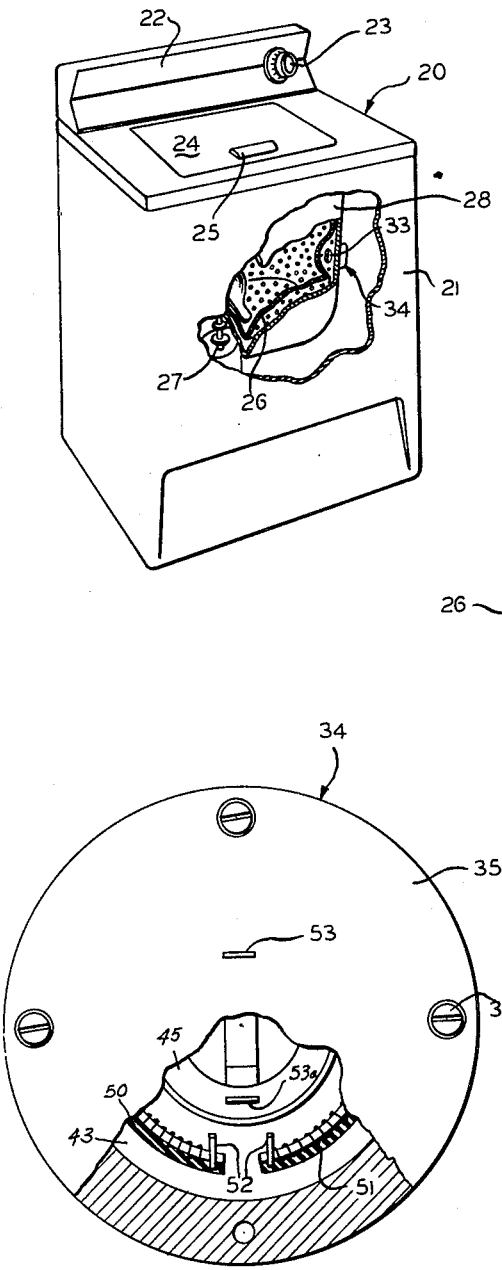

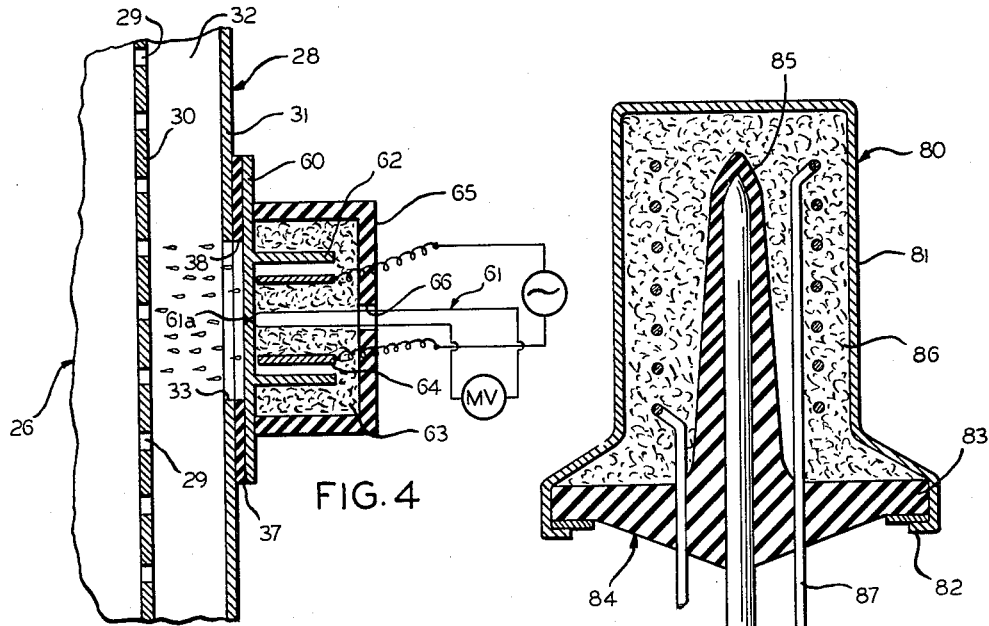
FIG. 4
FIG. 6
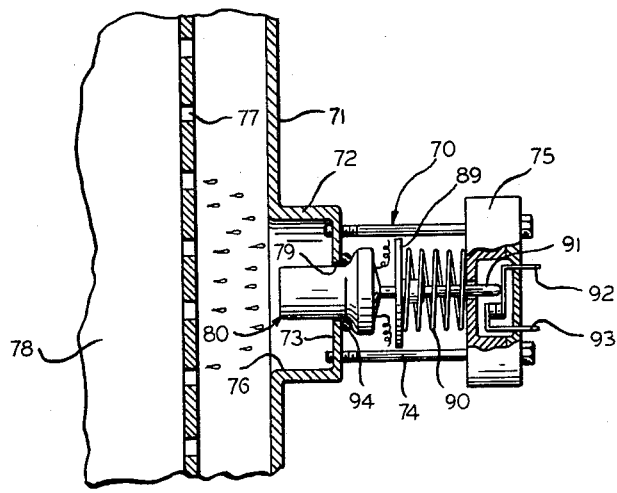
FIG. 5

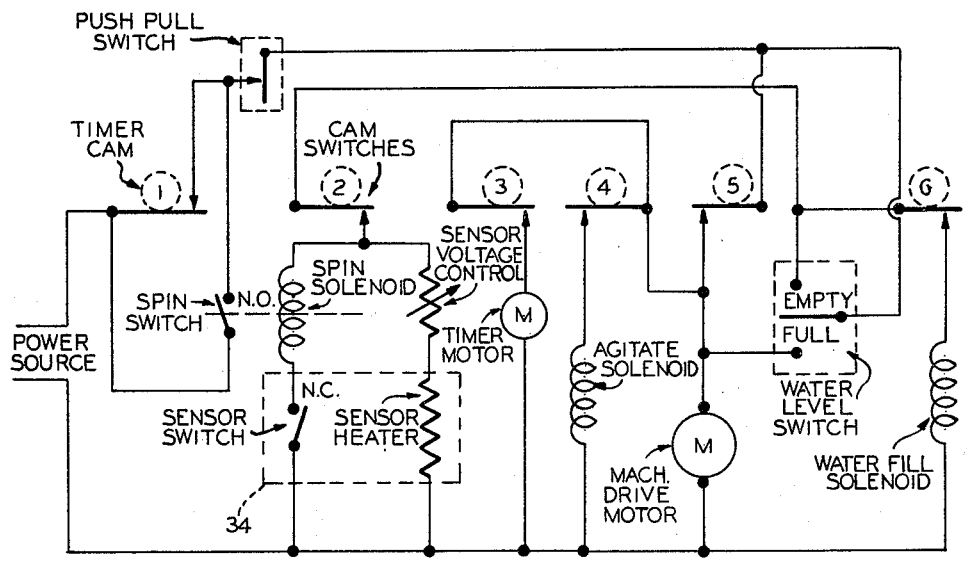

| MACH. FUNCTION | CAM | FILL & WASH | DRAIN | FILL & RINSE | DRAIN | SPIN DURATION CONTROLLED BY SENSOR |
|---|---|---|---|---|---|---|
| POWER | 1 | | | | | |
| SPIN & SENSOR HEATER | 2 | | | | | |
| TIMER MOTOR | 3 | | | | | |
| AGITATE | 4 | | | | | |
| BY-PASS | 5 | | | | | |
| WATER FILL | 6 | | | | | |
| MACH. MOTOR | | | | | | |
| PUMP | | | | | | |
| TIME (MINUTES) | | 1 2 3 4 5 6 7 8 9 10 11 12 | 1 2 | 1 2 3 4 | 1 2 | 1 2 3 4 5 6 7 8 9 10 |

▨ ELECTRICALLY CONTROLLED BY CAM SWITCHES

▨ ENERGIZED THROUGH WATER LEVEL SWITCH

▤ BY MECHANICAL ACTION

▥ TIME CONTROLLED BY SENSOR

FIG. 8

INVENTORS
CLIFTON A. COBB
EDWARD E. WIESSNER
BY JAMES T. WILLIAMS

ATTORNEYS

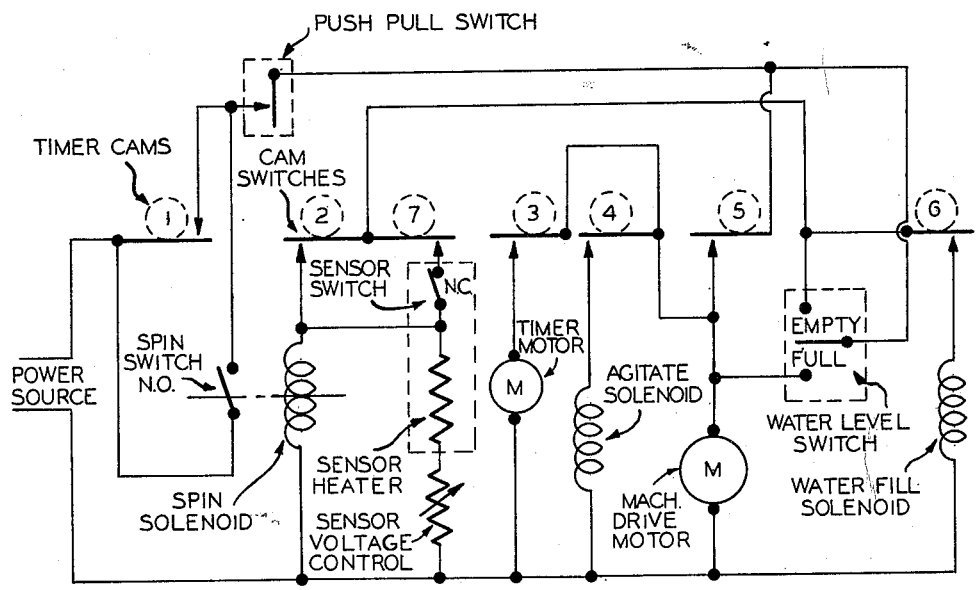

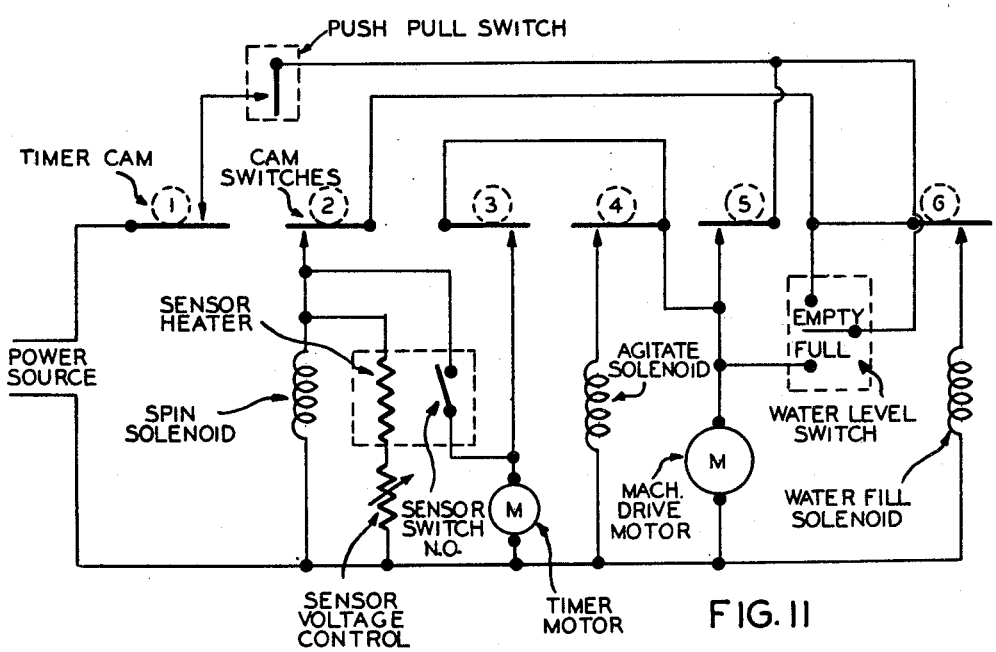

3,184,932
CLOTHES WASHING MACHINE WITH MEANS FOR CONTROLLING DURATION OF EXTRACTING CYCLE
Clifton A. Cobb and Edward E. Wiessner, St. Joseph, Mich., and James T. Williams, Riverside, Ill., assignors to Whirlpool Corporation, St. Joseph, Mich., a corporation of Delaware
Continuation of application Ser. No. 833,002, Aug. 11, 1959. This application Feb. 19, 1963, Ser. No. 264,995
13 Claims. (Cl. 68—12)

This application is a continuation of our co-pending application Serial No. 833,002, filed August 11, 1959 and now abandoned.

The present invention relates broadly to the art of fluid extraction, and is more particularly concerned with novel apparatus for controlling drive means for centrifuging apparatus in response to fluid extraction from wet articles by said centrifuging apparatus.

Apparatus now used to extract or remove fluids from wet articles customarily operate in accordance with a pre-set timing cycle which is unrelated to the moisture retained by the articles in a particular phase of the cycle. In such apparatus, of which the domestic automatic washer is an exemplary machine, a machine containing varying size loads or varying fabrics is spun or otherwise centrifuged for the same time duration, even though certain of the machine loads have moisture retention properties greater than others. By way of illustration, the housewife frequently loads the machine with bath towels and other highly water absorbent materials, and when using the pre-set timing sequence for the spin cycle, the towels frequently still retain moisture at the end of the extraction cycle in excess of that desired. The action then normally taken is to reset the timer to repeat all or a portion of the extraction cycle, and this of course requires attention on the part of the operator or a monitoring of the machine operation. The housewife also frequently loads the machine with delicate fabrics which require very little centrifuging to achieve the desired moisture retention expected of an automatic washer.

It is accordingly an important aim of the present invention to provide apparatus for extracting fluid from articles wherein the duration of the extraction operation is correlated with the rate of fluid extracted from said articles.

Another object of this invention is to provide control means responsive to fluid extracted from wet articles housed by a rotatable container actuated by drive means for rotating the container to centrifugally extract fluid from the articles therein, the control means automatically terminating the operation of the drive means independent of conventional timing devices.

A further object of the instant invention lies in the provision of a fluid extractor control device particularly well suited for use in association with a domestic laundry machine, and which incorporates therein sensing means exposed to fluid centrifugally extracted from articles in the machine and effective when a substantial amount of fluid has been removed from the articles to terminate the centrifuging operation.

A still further object of this invention is to provide fluid extractor control means for mounting against an opening in a laundrytub and spaced from a perforated rotatable basket or drum, the control means including a thermo-responsive member adjacent the tub opening and heating means for said member, the heated member being maintained relatively cool by fluid extracted from articles in the basket during rotation thereof and being effective during substantially reduced fluid removal to actuate switch means in association therewith to terminate basket rotation.

A still further object of this invention lies in the provision of fluid extractor control means of the character described and which may readily be adjusted to provide selective dampness control without dependence upon the timer.

Other objects and advantages of this invention will become more apparent during the course of the following description, particularly when taken in connection with the accompanying drawings.

In the drawings, wherein like numerals designate like parts throughout the same:

FIGURE 1 is a view of an illustrative type of laundry machine, with parts thereof broken away to show one manner of mounting the fluid extractor control means of this invention;

FIGURE 2 is a vertical sectional view of one form of control device mounted in the manner of FIGURE 1;

FIGURE 3 is a side elevation of the control device taken along line III—III of FIGURE 2, a portion thereof having been broken away to more clearly show the heating means for the thermo-responsive member of the control device;

FIGURE 4 is a vertical sectional view of another embodiment of our invention showing a fluid extractor sensing means only;

FIGURE 5 is a sectional view, with parts thereof in elevation, illustrating an additional form of fluid extractor control means constructed in accordance with the principles of this invention;

FIGURE 6 is a sectional view of the thermo-sensitive element employed in the arrangement of FIGURE 5;

FIGURES 7, 9 and 11 are circuit diagrams illustrative of three electrical systems embodying fluid extractor control means in accordance with this invention; and FIGURES 8, 10 and 12 are program charts of typical laundry cycles employed in connection with the electrical systems of FIGURES 7, 9 and 11, respectively.

The instant invention is of general applicability and may be employed in any art requiring extraction of fluid from a body. Illustrative of such applications are removal of the liquid carrier for granular or pelletized materials, as well as fluid extraction from various fibrous and non-fibrous materials, whether or not in sheeting or other forms. A particularly useful application is made in laundry apparatus wherein liquid is extracted from clothes during a laundry operation which may include a program of scheduled washing, rinsing and extracting periods.

Referring now first to FIGURE 1, there is shown a laundry machine generally designated by the numeral 20, and comprising an outer cabinet 21 suitably finished to enhance its decorative appearance. The cabinet 21 may mount along the top wall thereof a control panel 22 having one or more knob and dial members 23 controlling various laundering functions, and in typical apparatus of the character illustrated the member 23 may be the washer control or timer, sometimes referred to herein as a presettable sequential control means, which by means of suitable circuitry and mechanical means, causes functioning of the fill and wash, drain, fill and rinse, drain and spin cycles of a typical automatic washer.

The top wall of the laundry machine 20 may further mount a door 24 having a handle 25 and providing access to a rotatable drum or basket 26, which by drive means or force-applying means 27, rotates relative to a tub or outer container 28 suitably mounted within the machine interior. The basket 26 is illustrated in FIGURE 1 as mounted for rotation about a vertical axis, although the invention is not limited thereto and functions equally well in association with a horizontal or tilted axis laundry machine. Access to the basket interior may be achieved through a door mounted by the front wall of the cabinet in such a horizontal axis machine, rather than through a door opening from the top wall of the illustrated vertical axis machine.

Referring now also to FIGURE 2, the basket 26 is provided with a plurality of spaced openings or perforations 29 in side wall 30 thereof, and the basket 26 is coaxially spaced from said wall 31 of the tub 28 to provide an annular space 32 therebetween. As is appreciated, during high speed rotation of the basket 26 with respect to the stationary tub 28, fluid extracted from the wet articles in the basket 26 is centrifugally impelled outwardly through the basket openings 29 in the direction of the tub side wall 31.

The tub wall 31 is passaged or apertured at a single location providing an opening 33 in fluid communication or transfer with adjacent or generally aligned openings 29 in the basket 26. Mounted in covering relation to the tub opening 33, to be affected by fluid transfer therethrough, is a control device or fluid extractor control means generally designated by the numeral 34.

The control device 34 comprises a cover member 35 of a suitable metal or plastic and securing the cover 35 to the tub wall 31 is a plurality of mounting means, which may take the form of screws 36 as shown. Interposed between the base of the cover member 35 and the tub wall 31 is a seal or gasket means 37 provided with a central opening 38 in registry with the opening 33 in the tub 28. The cover member 35 is shaped to provide a central internal cavity or well 39, and received within the cavity in flush fitting contact with the gasket member 37 is a switch assembly covering member 40.

The cover member 40 is constructed of a good heat conducting material, and may be seen to be of general dome shape having a top wall 41 connecting with side wall 42 and a base flange 43 insulated from the main cover 35 by an annular gasket 44. By this arrangement, it will be noted that a portion of the covering member wall 41 is exposed to centrifugally impelled fluid directed through the openings 29, 33, and 38, and thereby the exposed portion of the wall 41 provides a "target area" for regulation of the control device 34 in the manner now to be described.

Generally centrally of the cavity of the main cover 35 there is mounted a support piece 45 receiving a slidable switch pin 46, the support piece carrying about its periphery an annular clamping flange 47 having a radially inwardly turned lip 48 cooperating with the support piece 45 to peripherally retain a sensor element 49 As appears, the sensor element 49 is provided by a pair of superimposed or facing bi-metallic discs normally held in the resilient tensioned position shown with one of the discs bearing inwardly against the cover member wall 41.

Along the inner face of the side wall 42 of the covering member 40 is an annular electrical insulation element 50 spacing an annular sensor heater element 51 from said wall 42. The sensor heater 51 electrically connects with a pair of heater terminals 52 mounted by the main cover 35 and connecting with the electrical system of the laundry machine 20 in the manner to be later described. Also mounted by the main cover 35 is a pair of switch elements 53 and 53a having a contact button 54 and 54a at one end thereof, shown in FIGURE 2 to be resiliently urged one against the other to provide a normally closed switch. However, it is apparent and will be brought out hereinafter that the control device may equally well embody a normally open switch.

In brief, the operation of the novel fluid extractor control device 34 is as follows. The heat conductive covering member 40 is heated by the sensor heater 51. The particular wattage supplied to the heater 51 can be selectively varied to provide a dampness control ever the articles from which fluid is being extracted. During rotation of the basket 26 with wet articles therein fluid is centrifugally extracted and impelled toward a "target area" provided by the tub opening 33 and gasket opening 38 leading to the covering member 40. Fluid being extracted from the articles in the tub 26 and striking the exposed portion of the covering member 40 maintains said member sufficiently cool and the sensor element 49 remains essentially in the inwardly bowed or inactive position of FIGure 2. However, as the rate of fluid being extracted from the articles decreases as the articles reach a condition of reduced wetness or relative dryness, the extracted fluid striking the covering member 40 is insufficient to remove the heat of said member supplied by the sensor heater 51. When this condition is reached, the heat from the covering member 40 is transmitted to the sensor element 49 causing said element to bulge or bow outwardly, contacting the switch pin 46 and driving said pin against the switch element 53 to release the contact button 54 thereof from abutment with the contact button 54a on the other switch element. The switch is thereupon opened and spinning or rotation of the drum or basket 26 terminated.

The action of the fluid extractor control device 34 in controlling the spin or extract portion of a complete laundry cycle will be more fully understood in connection with FIGURES 7 and 8, to which reference is now made. As shown therein, the laundry machine may be advanced through the washing and rinsing portions of the complete cycle by means of the known type rotary drum sequential timer or controller having six numbered cams associated therewith. A suitable power source connects to one side each of the normally closed sensor switch, sensor heater, timer motor, agitate solenoid, machine drive motor and water fill solenoid. The power source further connects with one side of a normally open spin switch which is in parallel with power cam switch 1 both of which are in a circuit closed by a manually operated push pull switch which feeds power to a water level switch when the push pull switch is closed. The water level switch has an upper "empty" contact through which the water fill solenoid is energized during filling and rinsing operations and a lower "full" contact through which the machine drive motor, agitate solenoid and timing motor are energized during other portions of the operation cycle. The upper "empty" contact is also in the circuit of the spin solenoid and sensor control to be described in greater detail hereinafter.

The program chart of FIGURE 8 sets forth by way of illustration a twelve minute fill and wash period, a two minute drain period, a four minute fill and rinse period, an additional two minute drain period and a subsequent spin period. These timed periods are merely illustrative and all except the final spin periods are of conventional nature. Only the final spin period will therefore be described in detail. As seen from FIGURES 7 and 8, as the rotary drum type sequential timer advances the machine operation into the spin portion of the laundry cycle, the cam switch controlled by timer cam 2 closes thereby completing the circuit through the "empty" contact of the water level switch to energize the spin solenoid and the sensor heater. When the spin solenoid is energized, the spin switch, which is spring-biased to its open position when the spin solenoid is de-energized, is closed by the spin solenoid as diagrammatically indicated in FIGURE 7. Other means could of course be employed to open and close the spin switch.

At the beginning of the spin cycle the cam switches controlled by cams 1 and 3 open while the switch controlled by cam 2 closes thereby supplying power to the machine through the spin switch and interrupting the timed operation of the machine. The cam switch controlled by cam 5 bypasses the water level switch to supply power to the machine motor which drives basket 26 through a conventional drive mechanism. Water extracted from fabrics placed within basket 26 is pumped to drain by means of a pump (not shown) which is driven by the drive motor and which is mechanically positioned to drain tube 23 whenever the agitate solenoid is de-energized. The remaining portion of the extraction or spin cycle is thereby under control of the fluid extractor control device 34. The basket 26 then spins until the rate of fluid extracted from the articles in the drum is such that heat supplied to the covering member 40 from the sensor heater 51 cannot be conducted away by extracted fluid thrown against the target area, which the covering member 40 provides through the tube opening 33 and gasket opening 38. The normally closed sensor switch comprising contacts 54 and 54a is thereby caused to open, which de-energizes the spin solenoid, causing the spin switch to open and cut off the power supply to the laundry machine. A subsequent closure of the sensor switch upon cooling of the bimetal element 49 does not again re-energize the circuit since the opening of the spin switch prevents such re-energization.

It is previously stated that selective dampness control over the articles being spun or extracted is a feature of this invention, and is achieved by varying the energy level or input wattage to the sensor heater 51. This is diagrammatically illustrated in FIGURE 7 as a sensor voltage control in the form of a variable resistor, although a rheostat or other means could of course be employed for this purpose. The sensor voltage control may be an automatic voltage control, such as any of those commercially available to compensate for changes in household voltage and maintain a constant input wattage to the sensor heater 51 or may be manually operated under the control of the user to compensate, for example, for varying installation line voltage. It will now be apparent that by adjusting the sensor voltage control to increase the wattage dissipated by sensor heater, the covering member 40 is caused to heat more rapidly, operating the bimetal sensor 49 in less time, and automatically shutting off the spin or extraction operation with more water retained in the articles in the basket 26. On the other hand, by reducing the wattage dissipated by the sensor heater, operation of the bimetal sensor 49 is delayed until the amount of water or other fluid being extracted is insufficient to dissipate the heat input. This automatically extends the spin operation until a lower level of fluid retention in the articles has been attained.

Under particular circumstances it may be desirable to provide a minimum and maximum extraction or spin time, and this can be accomplished by running the timer motor during the entire extraction or spin portion of the cycle. Circuitry for this purpose is shown in FIGURE 9, and in FIGURE 10 there is set forth an illustrative program chart showing machine operation with the timer motor in operation during spinning or extraction.

In this arrangement, as the timer advances the machine into the spin portion of its cycle, cam switch which is controlled by timer cam 2 closes the spin solenoid circuit and cam 1 opens one power circuit while another is provided through the spin switch which closes upon energization of the spin solenoid. After the minimum spin time, which may be two minutes as illustrated, cam switch 7 in the spin solenoid and sensor circuits closes and cam switch 2 opens. Accordingly the spin solenoid remains energized under control of the fluid extractor control device 34. Under this condition, if the sensor element 49 should cause the normally closed sensor switch to open, the spin solenoid will be de-energized, thereby opening the spin switch and shutting all power to the machine. The fluid extractor control device 34 then controls the spin operation only from the maximum to minimum times set, which are from 2 to 10 minutes of spin in the illustrative program chart shown in FIGURE 10. If for any reason the sensor switch should fail to shut the machine off within 10 minutes, the timer motor by being in operation opens the cam switch which is controlled by timer cam 7 at the end of 10 minutes, to deenergize the spin solenoid and thereby cause the spin switch to open and shut off all power to the machine at maximum spin or extraction time.

It will be appreciated that by proper design the degree of responsiveness of the fluid extractor control device 34 may be varied. That is it may be designed to take a predetermined minimum period of time for heater 51 to open the sensor switch. The termination of the extraction operation in this embodiment can then be said to be dependent upon one of two timers, one being a motor driven timer controlling the switch actuated by timer cam 7 after some maximum period of time and the other being a thermal timer actuating the sensor switch after some variable period of time following the lapsing of the minimum period depending upon the rate of fluid extracted against the fluid extractor control device 34.

As earlier noted, the fluid extraction control device can well embody a normally open rather than a normally closed sensor switch. Circuitry utilizing a normally open switch is illustrated in FIGURE 11, and in accompanying FIGURE 12 appears a program chart of machine operation employing the circuit diagram of FIGURE 11. In this arrangement, as the timer advances the machine into the spin or extraction portion of the laundry cycle, cam switch 2 closes and cam switch 3 opens. The spin solenoid and sensor heater are then energized through the cam switch controlled by timer cam 2. When the rate of extraction reaches a point at which the sensor heater operates the sensor switch of FIGURE 11, the normally open sensor switch closes, by action of the sensor element 49 against the switch pin 46, to thereby energize the timer motor. The timer motor then runs for some predetermined length of time, as, for example, for one minute as illustrated in FIGURE 12, to an off position, or in the case of a combination washer-extractor-drier, to the beginning of the drying cycle.

It will be apparent that numerous modifications may be made to the condition-sensitive control means already described or other embodiments could be substituted. Two additional exemplary structures embodying the principles of the invention are shown in FIGURES 4, 5 and 6.

In FIGURE 4 in the basket or drum 26, outer container or tub 28 and opening 33 therein, and gasket member 37 and opening 38 therein are essentially identical to corresponding elements in FIGURE 2, and accordingly, like numerals have been appended to these parts. Bearing against the gasket member 37 in the structure of FIGURE 4 is a heat conductive plate member 60 having a hot junction 61a of a thermocouple 61 attached to it and provided with an annular collar 62 embedded in a packing medium 63 heated by a heating element 64 connected to a power source and housed by a cover member 65 formed of a suitable metal or plastic.

The packing medium 63 is a material having good heat insulation characteristics, and wattage input to the heating element 64 heats the collar member 62, whereby the connecting plate member 60 is heated by heater 64 much like the covering member 40 of FIGURE 2. When the rate of fluid extracted from the articles in the basket 26 and passing through the openings 29 therein through the tub opening 33 and aperture 38 in the insulation member 37 decreases to the point at which said extracted fluid has little cooling effect upon the target area of the plate member 60, the temperature of the plate member 60 will increase. Since the hot junction 61a of the thermocouple 61 senses the temperature of the target area of the plate member 60, an indicator such as a milli-voltmeter connected to the thermocouple 61 will show this increasing temperature thus indicating the completion of the extraction cycle, so that the machine could be manually shut off.

A further form of fluid extractor control device is illustrated in FIGURES 5 and 6, being designated therein generally by the numeral 70. As shown therein, tub or outer container 71 is formed with a raised portion 72 having an inwardly directed flange 73 receiving mounting screws or the like 74 securing a switch assembly support 75 thereto. The tub raised portion 72 and flange 73 thereon define a tub opening 76 in fluid communication with openings 77 in rotatable basket or drum 78.

Received in a central opening 79 in the tub flange 73 is a thermo-responsive or sensitive element generally designated at 80 and preferably constructed in essentially the manner shown in FIGURE 6. The element 80 comprises a casing or housing 81 of metal or plastic formed with an inwardly turned flange portion 82 seating an integral base or collar portion 83 on a flexible diaphragm member 84 formed or shaped to provide a probe or nose portion 85. The diaphragm probe portion 85 is surrounded by or embedded in a solid charge material 86, and maintaining the temperature of the charge at a particular level is an embedded heating element 87. The solid charge material may be constituted of compounds suitable for the disclosed application, and may be a mixture of wax, an efficient heat conductive material such as powdered copper and a suitable binder.

The diaphragm member 84 is preferably formed of a durable rubber and securely received therein is a plunger member 88 threaded at one end to mount a disc 89 (FIGURE 5) which bottoms one end of a spring 90 bottomed by the switch assembly support 75 at its opposite end and surrounding a switch pin 91 to hold the same in a normally retracted position free of contact with switch element 92 to hold said element in either a normally closed or normally open position with respect to switch element 93. As appears also in FIGURE 5, fluid leakage through the opening 79 in the tub portion flange 73 is prevented by annular seal means 94.

The operation of the fluid extraction control means 70 of FIGURES 5 and 6 is as follows. The resilient means or spring 90 holds the switch pin 91 in a retracted position and functionally coooperates with the thermo-sensitive or responsive member 80 the casing 81 of which is cooled by fluid impelled thereagainst during extraction or spinning, whereby the charge material 86 remains in an essentially solid state. However, when the rate of fluid striking the casing 81 of the thermo-sensitive member 80 is insufficient for cooling effects, the charge material 86 is rendered relatively less solid and a force exerted upon the base or collar portion 83 of the diaphragm member 84 to move the plunger member 88 to the right as viewed in FIGURE 5, in opposition to the spring means 90, to cause the switch pin 91 to open the illustrated normally closed switch. The heater 87 of FIGURES 5 and 7, as well as the heater 64 of FIGURE 4, may have an input wattage thereto variable to provide selective dampness control as described in connection with the control device 34 of FIGURES 1 to 3.

It may now be seen that applicants have provided a novel structure which may function independently of or in cooperation with a timer mechanism to control or terminate basket rotation in accordance with or responsive to fluid extracted from wet articles contained by the basket. The control means of this invention embodies relatively few parts of simple construction, assuring long dependable operation. The control means may take various forms as shown, and in each form selective dampness control is achieved by a relatively simple adjustment of wattage input, whereby the user can preselect a degree of relative dryness in accordance with individual wishes. The fluid extractor control means operates independent of manual attention, and it is accordingly no longer necessary that the housewife or other machine user return to the machine to make a timer adjustment when it is desired to extract a greater amount of fluid than normally obtained by the duration of the customary timer cycle.

The laundry machine 20 is of the type having heating means actuated by the sequential controller 23 or evaporating additional fluid from the articles. Accordingly, fluid is extracted centrifugally from the articles until the rate of extraction of fluid from the articles reaches a predetermined minimum level, whereupon heat may be applied to the articles to evaporate the remaining fluid from the articles. The heating means may comprise either electrical heating means or gas-fired heating means, as is well appreciated by those versed in the art.

As pointed out, the control means of this invention finds applications other than in the domestic laundry art, and the control means may be varied in its structural characteristics and still produce the novel results herein disclosed. It is thus apparent that numerous changes and variations may be effected in the structures herein disclosed without departing from the novel concepts of the present invention.

The embodiments of the invention in which an exclusive property or privilege is claimed are defined as follows:

1. Apparatus for extracting liquid from articles, comprising,
   a container having an aperture in one wall thereof,
   a foraminous drum within said container for retaining wet articles,
   drive means for rotating said drum relative to said container to centrifugally extract liquid from said articles and impel said liquid radially outwardly of the axis of rotation toward said container aperture,
   a control device mounted by the container against the aperture therein,
       said control device including a temperature responsive body essentially closing the container aperture and having a member movable upon temperature variations in said body,
   switch means actuated by said member upon movement thereof,
   and means connecting the switch means to said drive means,
       said temperature responsive body being controlled by the liquid extracted centrifugally from said articles and impelled against said body and being effective in the absence of sufficient extracted liquid to move said member and actuate said switch means to terminate operation of said drive means and rotation of said drum.

2. Apparatus for extracting liquid from articles comprising,
   force applying means for applying an extraction force to said articles to extract liquid therefrom,
   an extraction control circuit for operating said force applying means during preselected operating periods including a sequential controller having timer operated control means and said force applying means, said circuit including
       a thermally responsive device positioned for contact with liquid extracted from said articles
       and responsive to the liquid so contacted for terminating the operation of said force applying means,
   heater means in said circuit for actuating said thermally responsive device when the liquid extracted from said articles contacts said thermally responsive device below a predetermined rate,
       and switch means in said circuit controlled by said timer operated control means of said sequential controller for terminating operation of said force applying means after a predetermined maximum period of time whenever said force applying means is not terminated by operation of said thermally responsive device.

3. Apparatus for extracting liquid from articles comprising,
   force applying means for applying an extraction force to said articles to extract liquid therefrom,
   an extraction control circuit including a sequential controller having timer operated control means and said force applying means,
       said circuit including
           a thermally responsive device in the path of and responsive to liquid extracted from said articles for terminating the operation of said force applying means, heater means in said circuit for actuating said thermally responsive device when the liquid extracted from said articles contacts said thermally responsive device below a predetermined rate,
switch means in said circuit controlled by said timer operated control means of said sequential controller for energizing said force applying means for a predetermined minimum period of time,
and second switch means in said circuit controlled by said timer operated control means of said sequential controller for terminating operation of said force applying means after a predetermined maximum period of time whenever said force applying means is not terminated by operation of said thermally responsive device.

4. Centrifuging apparatus, comprising,
a rotatable container for retaining wet articles,
drive means for rotating said container at speeds sufficient for centrifugally extracting fluid from said articles and for centrifugally discharging the extracted liquid from the container,
and control means having
thermally conductive means,
said control means having input means for supplying thermal energy to said conductive means,
said conductive means positioned outwardly of said container in the discharge path of centrifugally extracted liquid,
whereby the energy supplied by said input means is carried away by said liquid as a function of the rate of liquid impinging on the conductive means,
and sensor means responsive to temperature changes of said conductive means resulting from variations in the rate of liquid impinged thereon for controlling said drive means.

5. Centrifuging apparatus as defined in claim 4, and means for selectively varying the quantum of thermal energy supplied by said input means, thereby adjusting the responsiveness of the control means to the liquid extracted to provide a selective extent of liquid removal from the articles being centrifuged.

6. Centrifuging apparatus as defined in claim 4,
a tub for housing said rotatable container,
said tub having an aperture in one wall thereof forming a target area,
said rotatable container comprising a foraminous drum within said container for retaining wet articles and said conductive means being positioned in said aperture.

7. Apparatus for extracting liquid from articles, comprising,
force applying means for applying a mechanical extraction force to said articles to extract liquid therefrom and discharging the extracted liquid remotely from said articles,
and means for automatically terminating the operation of said force applying means including
thermally conductive means,
input means for supplying thermal energy to said conductive means,
said conductive means being positioned in the discharge path of the extracted liquid,
whereby the energy supplied by said input means is carried away by said liquid as a function of the rate of liquid impinging on the conductive means,
and sensor means responsive to temperature changes of said conductive means resulting from variations in the rate of liquid impinged thereon for controlling the operation of said force applying means.

8. Extraction apparatus for centrifuging an evaporating liquid from articles comprising,
a rotatable container,
drive means for rotating said container about an axis of rotation to extract liquid from said articles,
a control device having
a thermally conductive member,
said control device having input means for supplying thermal energy to said thermally conductive member,
said conductive means positioned outwardly of said container in the discharge path of extracted liquid,
whereby the energy supplied by said input means is carried away by said liquid as a function of the rate of liquid impinging on the conductive member,
and sensor means responsive to temperature changes of said conductor member resulting from variations in the rate of liquid impinged thereon for controlling said drive means,
circuit means including said control device and a sequential controller for operating said apparatus through a series of periods in a programmed cycle and operable with said control device when the rate of extraction of liquid from said articles reaches a predetermined minimum level to operate in a different period of the cycle,
and heating means controlled by said sequential controller for evaporating additional liquid from said articles.

9. Extraction apparatus as defined in claim 8 and adjustment means for selectively varying the rate of thermal energy supplied by said input means, thereby adjusting the responsiveness of the control device.

10. In a clothes washing machine, comprising,
a tub to receive liquid and clothes to be washed therein,
time control means operative for conducting said machine through a cycle of operations including at least one liquid introducing operation,
means for extracting liquid from said tub for subsequent removal from said machine,
said time control means operative to render said extracting means operative, and
circuit means activated when liquid is being extracted from said tub,
said circuit means on operation controlling said time control means,
said extracting means thereafter remaining operative to continue extracting liquid from said tub,
said circuit means responsive to an absence of liquid being extracted for rendering said time control means operative to continue said conducting of the machine through its cycle.

11. Centrifuging apparatus comprising
a rotatable container for retaining wet articles,
drive means for rotating said container at speeds sufficient for centrifugally extracting liquid from said articles and for discharging the extracted liquid from the container,
and control means positioned radially outwardly of said container directly in the discharge path of centrifugally extracted liquid and responsive to variations in the rate of liquid impinged thereon for controlling said drive means.

12. A clothes washing machine comprising
a tub to receive liquid and clothes to be washed therein,
means for rotating said tub to extract liquid from said tub and said clothes,
mechanism for activating said extraction means to initiate rotation of said tub and subsequently to terminate said extraction operation,
means including a timer motor to operate said extraction means activating mechanism to initiate said extraction operation and after a predetermined period of operation of said timer motor to terminate said extraction operation,
means responsive to changes in the rate of extraction of liquid, means to interrupt operation of said timer motor, circuit means for maintaining said tub rotative while the timer motor operation is interrupted, said responsive means being responsive to a substantial reduction in the rate of extraction of liquid to restore operation of said timer motor to complete its said period of operation.

13. In a clothes washing machine comprising a tub to receive liquid and clothes to be washed therein, circuit means including time control means operative for conducting said machine through a cycle of operations including at least one liquid introducing operation, means for extracting liquid from said tub for subsequent removal from said machine, said time control means being operative to render said extracting means operative, and to render said time control means inoperative, said extracting means thereafter remaining operative to continue extracting liquid from said tub, said circuit means including control means being responsive to an absence of liquid being extracted for rendering said time control means operative to continue said conducting of the machine through its cycle.

References Cited by the Examiner

UNITED STATES PATENTS

| | | | |
|---|---|---|---|
| 2,019,896 | 11/35 | Edlich | 68—18.2 |
| 2,166,799 | 7/39 | Crago | 73—336.5 X |
| 2,263,681 | 11/41 | Hart | 34—55 X |
| 2,282,480 | 5/42 | Keeler | 73—336.5 X |
| 2,321,641 | 6/43 | Anderson | 68—12 |
| 2,561,119 | 7/51 | Horvath | 68—12 |
| 2,574,298 | 11/51 | Smith | 34—55 X |
| 2,820,304 | 1/58 | Horecky | 34—45 |
| 2,878,579 | 3/59 | Fuchs | 34—45 |
| 2,895,230 | 7/59 | Reiley | 34—45 |
| 2,968,174 | 1/61 | Bell et al. | 68—24 |
| 2,991,641 | 7/61 | Woodling | 34—45 X |
| 3,009,256 | 11/61 | Lynch | 34—45 |
| 3,043,125 | 7/62 | Horecky | 68—12 |

FOREIGN PATENTS

| | | |
|---|---|---|
| 312,997 | 3/30 | Great Britain. |

WALTER A. SCHEEL, *Primary Examiner.*